Sept. 25, 1962   N. CORDIS   3,055,485
CONVEYOR SYSTEM FOR ANIMAL HUSBANDRY
Filed Dec. 8, 1958   3 Sheets-Sheet 1
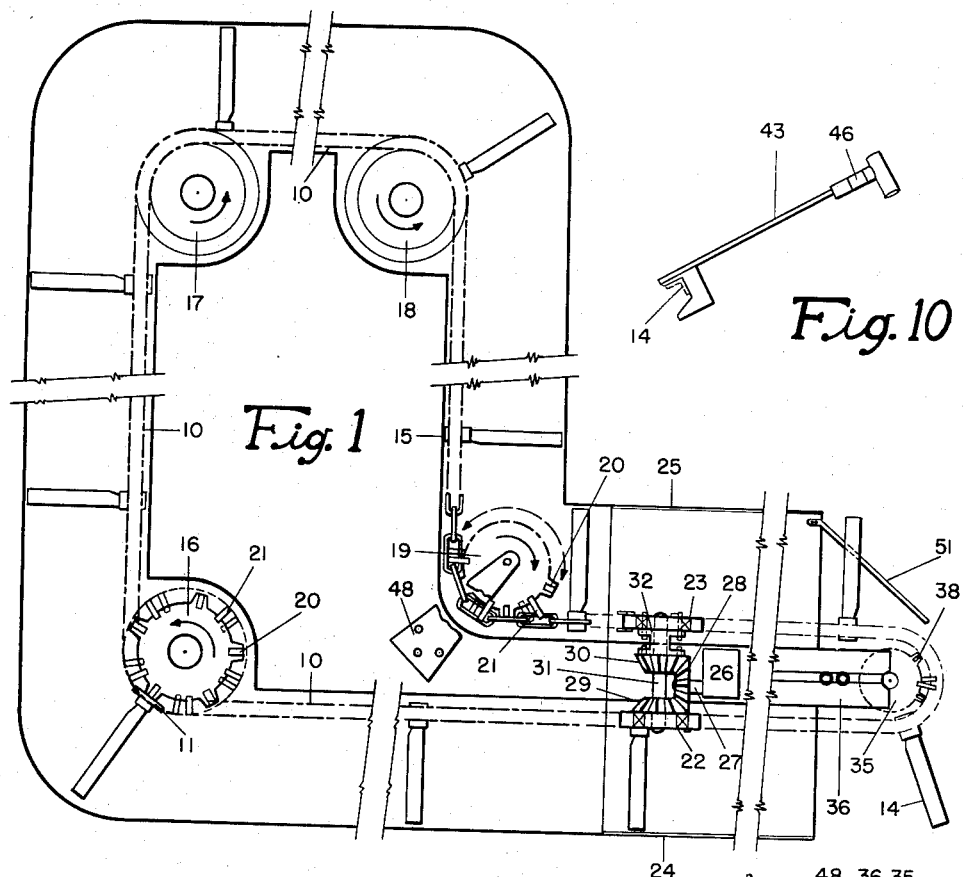
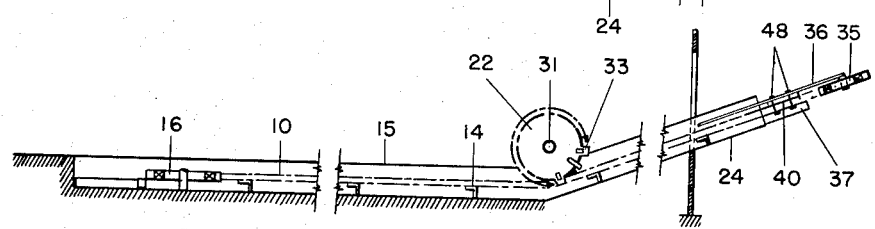
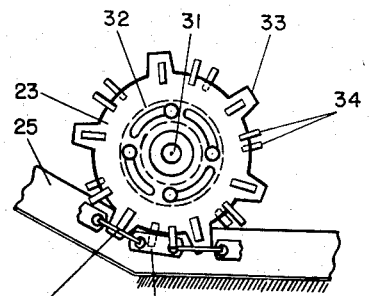
INVENTOR.
NAT CORDIS
BY *Everett A. Johnson*
ATTORNEY

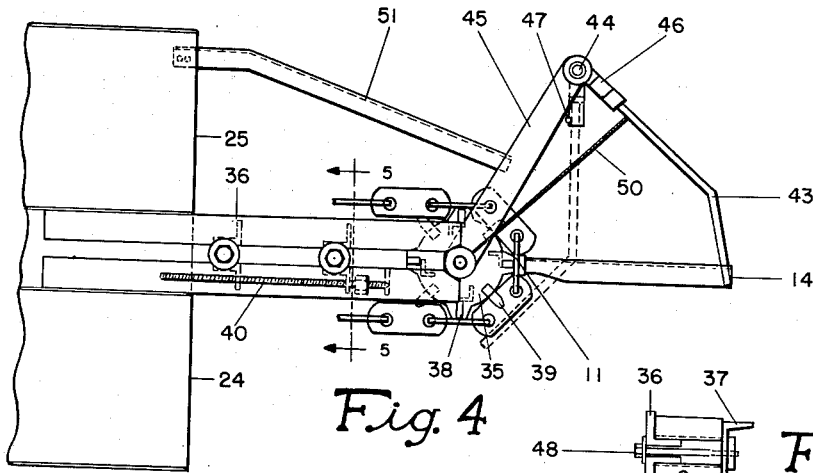
Fig. 4
Fig. 5
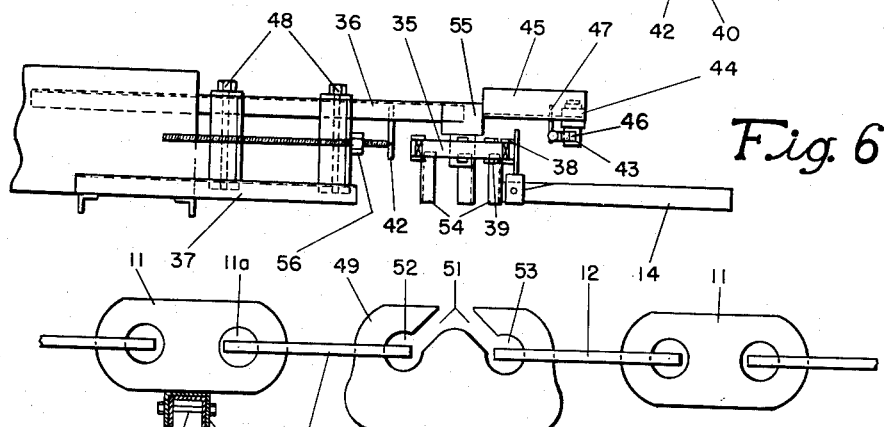
Fig. 6
Fig. 7
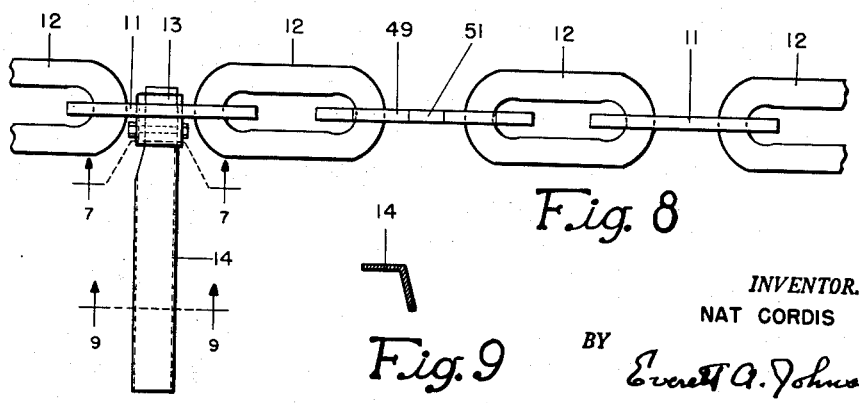
Fig. 8
Fig. 9
INVENTOR.
NAT CORDIS
BY Everett A. Johnson
ATTORNEY

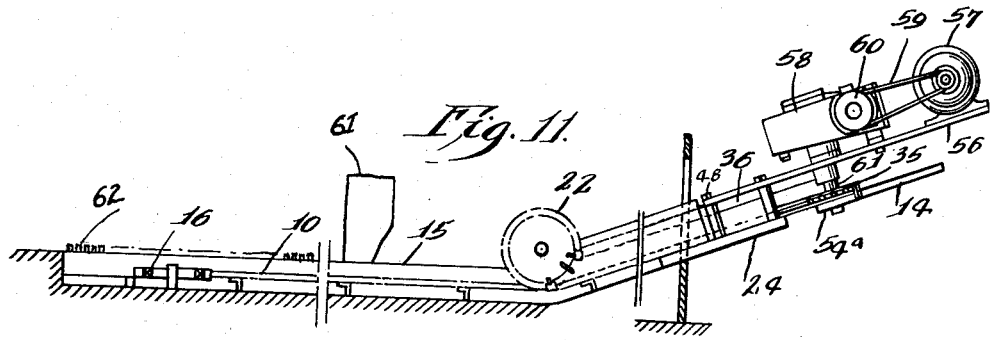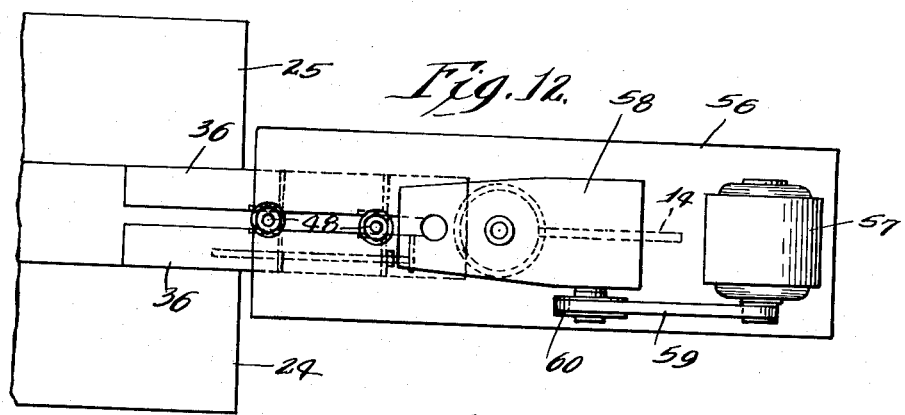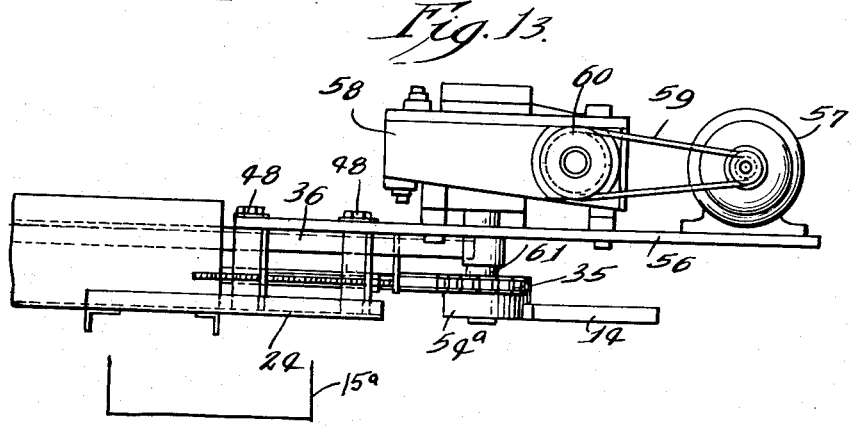

United States Patent Office

3,055,485
Patented Sept. 25, 1962

3,055,485
CONVEYOR SYSTEM FOR ANIMAL HUSBANDRY
Nat Cordis, Crown Farms, Silver Lake, Wis.
Filed Dec. 8, 1958, Ser. No. 778,948
12 Claims. (Cl. 198—137)

This invention relates to improvements in conveyors for use in animal husbandry and more particularly to a mechanical barn cleaner comprising in combination a unitary trough cleaner and refuse elevator.

Mechanical barn cleaners have contributed greatly to the sanitary operation of dairy farms where the rapid elimination of refuse is desired. Also mechanical stock feeders have contributed to efficient operation of both dairy and poultry farms. More recently it has been proposed to provide poultry houses with cages or slat floors and to remove the droppings from below.

Equipment of the type to which this invention relates is adaptable for all these purposes and comprises an endless chain having suitable paddles or the like fixed thereto which travels within a channel and discharges refuse or conveys feed.

It is, therefore, a principal object of this invention to provide an improved cleaner and conveyor which removes refuse quickly and efficiently. Another object of this invention is to provide a combination conveyor-elevator which is durable, which employs an endless chain, and which is operable on two levels. A further object is to provide a chain and sprocket system adapted to be driven from either the top or the side of the chain. Further objects and advantages of the invention will become apparent as the description thereof proceeds.

Briefly, the invention provides a material handling apparatus of the type having an open top channel with a conveyor traveling therealong in a continuous circuit comprising a series of linear channels connected by non-linear channels, an endless, kink-proof conveyor traveling successively along linear channels and through non-linear channels, idler means mounted adjacent such non-linear channels on an axis substantially normal to the plane of travel of the conveyor through the channels for turning movement within the non-linear channels, the conveyor having material engaging means carried in a substantially horizontal path within said channels and about at least one idler means with at least a portion of the material engaging means extending radially inward thereof. The chain operatively engages the idler means for turning the idler means about its axis by the travel of the chain through the non-linear channels whereby the material handled is conveyed in a substantially uniform manner within the linear and non-linear channels.

The invention also provides in a material handling conveyor system employing an endless chain with material engaging means fixed to spaced links of said chain and extending in a direction generally transverse to the path of chain travel. An idler for guiding the path of travel of such chain includes a rotatable substantially disc-like element mounted on an axis arranged substantially perpendicular to a plane parallel to the plane of the path of travel of the chain, and has a spaced array of depending pins or fingers adjacent but spaced from the periphery of the disc-like element, the pins extending normal to the plane of rotation of the idler whereby the idler is rotated by travel of the chain thereabout.

It is also within the purview of the invention to provide a combination conveyor and elevator comprising a looped channel in one plane, a conveyor chain within said channel comprising a series of vertically-disposed links alternately spaced by a series of horizontally-disposed links, a plurality of paddles secured to and extending downwardly and outwardly from the axis of said endless conveyor chain, a plurality of idler sprockets disposed adjacent said channel and adapted to be rotated in the plane of chain travel within the looped channel, chain guide means such as another idler sprocket suspended within the channel and spaced from the bottom thereof to permit the passage of the paddles, inclined elevator channels, portions of said looped channel and the lower ends of said elevator channels being in alignment, an idler at the upper end of said elevator channels, drive sprocket means mounted astride said channels in planes perpendicular to the plane of travel of the chain, such drive sprocket means being adapted to enter the horizontal links of said chain, and separate means for aligning the vertical links of said chain passing under said drive sprocket means.

As applied to a barn cleaner, the invention comprises an endless chain conveyor arranged to travel in a gutter associated with the cattle stalls in a cattle barn as is usual with such arrangements. The chain is arranged to travel over prefabricated sprocket assemblies located well above the bottom of the gutter. At intervals the chain is provided with depending blade mounts which may be substantially U-shaped clamps welded to the chain and adapted and arranged to embrace the ends of scraper blades, these scraper blades being arranged to travel over and ride upon the bottom of the gutter. These blades thereby support the chain between the sprockets well above the bottom of the gutter so that the chain will not come into intimate contact with the liquid refuse material within the gutter.

At one point in the gutter system, inclined troughs or continuations of the gutters are provided which extend outwardly and upwardly to provide the bed of an elevator for removing refuse material from the barn. Such elevator may be located at a corner or as a branch of one of the gutters since by the novel chain and sprocket construction it is possible to carry the paddles along the floor of the gutter and elevator and yet make right or left hand turns.

The exterior end of the elevator is adjustable to provide takeup for the chain assembly and at the point of rise a pair of oppositely driven sprockets is provided above the continuous chain. In this manner, the outward flight is driven upwardly within the inclined trough and the return flight is drawn downwardly. The prefabricated gutter sprocket assemblies are fixed in the gutter and the total compensation for wear can be made by adjusting the distance that the idler sprocket at the discharge end of the elevator is disposed from the pair of drive sprockets.

The invention will be better understood in its broad and specific aspects by reference to the following detailed description of a preferred embodiment and to the attached drawings forming part thereof wherein like reference numerals indicate corresponding parts in the various figures.

FIGURES 1 and 2 are diagrammatic representations illustrating the preferred application of the combination barn cleaner and elevator. More specifically, FIGURE 1 is a top plan view showing a looped channel and elevator channels in accordance with one embodiment of the invention, and FIGURE 2 is an end elevation of the embodiment in FIGURE 1, partly in section and with elements removed.

In FIGURE 3, there are illustrated details of the adjustable drive sprocket illustrated in FIGURES 1 and 2, the operation of which will be evident from the description hereinafter.

FIGURES 4 and 6 are top and side views of the discharge end of the conveyor, partly in section and with some parts removed. FIGURE 5 is a section taken along the line 5—5 in FIGURE 4.

FIGURES 7 and 8 are end and top views respectively showing portions of an endless conveyor chain and paddle mounting employed in the invention.

FIGURE 9 is a section of the paddle taken along the line 9—9 in FIGURE 8. FIGURE 10 illustrates the details of a blade cleaner shown in FIGURE 4.

FIGURE 11 is an elevation, partly in section, illustrating a modification wherein the drive means is at the head of the elevator.

FIGURES 12 and 13 are fragmentary top and side views of the discharge end of the conveyor of FIGURE 11.

Referring to the drawing, the illustrated conveyor chain 10 is of a novel construction comprising links 11 and 12. Link 11 may consist of a dually-punched plate, the punched openings 11a being adapted to receive links 12. The links 12 are the same length as link 11, but all of the material between the openings 11a may be punched out. To fabricate the chain, the links 12 are cut on one long side and spread apart without deforming either end or the other side of the chain. The open link is then inserted into the eyes 11a of the punched plate link 11 and welded. This produces a chain comprising a series of vertically-disposed links 12 alternately spaced by a series of horizontally-disopsed links 11. It is contemplated, however, that the conveyor may be composed of twisted wire links with material engaging discs or ellipses arranged on selected links.

The above description makes reference to one preferred method of fabricating the links 11 and 12 of the chain 10. In another embodiment, the links 12 can be made by cutting the links across the short dimension, inserting the two alternate punched plates 11, and butt-welding the two segments of the split links 12.

At spaced intervals the chain 10 is provided with depending substantially U-shaped clamps 13 adapted and arranged to hold the ends of the scraper blades 14. These clamps 13 are fixed, as for example by welding, to the vertically-disposed plate link 11 as shown in FIGURES 3 and 4. The clamps 13 provide a hinge fastening for the scrapers 14. The fixed end of the scraper 14 is formed into a U and has a bolt hole which takes the bolt or hinge pin 13a for fastening to the inverted U-shaped clamp 13 carried by plate link 11. Also, the leading edge of the scraper 14 is formed at an angle to the hole, thereby providing a positive rake on the scraper and forcing the scraper to the bottom of the gutter.

As the chain 10 and scraper blades or paddles 14 travel within the channel 15, they pass over idler sprockets 16, 17, 18 and reverse turn sprocket 19. These sprockets are of novel construction in that they are provided with stub teeth 20 and spaced guide bars 21. The guide bars 21 extend radially from the faces of the sprockets 16 to 19 and are disposed between the stub teeth 20. In the preferred arrangement, the guide bars are circumferentially displaced from each other and from the teeth 20 for self-cleaning and more foolproof guiding of the endless links 12, the continuous face of the plate link 11 riding on the stub teeth 20.

In the preferred embodiment, the idler sprockets 16, 17 and 18 and the reverse turn corner sprocket 19 are fully prefabricated and may be readily set in the concrete trough and floor by unskilled labor. Reverting to reverse turn sprocket 19, it is suspended within the trough or gutter by the bracket 48, thereby permitting the depending paddles 13 to pass beneath the sprocket 19 and the chain between the sprocket and the gutter wall.

The drive mechanism comprises a pair of sprockets 22 and 23 arranged transverse to the direction of the chain 10 over the elevator. The elevator comprises a pair of inclined parallel chutes 24 and 25 which terminate short of the outward travel of the chain 10 and blades 13. In one embodiment, the power source 26 is applied to shaft 27 which in turn drives bevel gear or pinion 28. Gears 29 and 30 are respectively adapted and arranged to drive sprockets 22 and 23 in opposite directions.

To accomplish this, the sprockets 22 and 23 may be mounted in oilite bushings and the gears 29 and 30 fixed to the sprockets. In this way the sprockets 22 and 23 can be driven in opposite directions on the single shaft 31. The return drive sprocket 23 is adjustable by interposing flanged hub 32 between the gear 30 and the sprocket 23. The hub 32 is provided with threaded bolt holes and the corresponding bolt holes in the sprocket are circumferentially elongated to provide 360 degree adjustment of the sprocket 23 relative to the driving gear 30.

The drive sprockets 22 and 23 are of somewhat different construction than the idler sprockets 16, 17, 18, and 19 in that the sprocket teeth 33 are adapted to enter the horizontal links 12 and the radial bars 34 guide the vertical links 11. By this general arrangement, the conveyor chain 10 is driven upwardly over the surface of the chute 24 by drive sprocket 22 and drawn downwardly within the return chute 25 by the return drive sprocket 23. The turnaround at the upper end of the elevator comprises an adjustable idler sprocket 35 carried by adjusting bar 36 which is slidably supported in elevator frame member 37. Bolted brackets 48 retain the adjusting bar 36 in the desired position.

In passing about idler 35, the fixed ends of blades 14 abut depending pin guides 54 and guide flange 54a (FIGURE 13) which are fixed to the lower side of idler 35. These guides prevent the paddles 14 from dropping downward in passing about 35. Incidentally, stub teeth 38 and guide bars 39 of sprocket 35 correspond to stub teeth 20 and guide bars 21, respectively, of idler sprockets 16, 17, 18 and 19.

In general, the idler turnaround sprocket 35 resembles the idler sprockets 16 to 19 and may be substituted therefor. In sprocket 35 the stub teeth 38 support the vertical plate links 11, and the endless links 12 are positioned about the sprocket by radial guide bars 39. The position of idler return sprocket 35 is adjusted by means of the adjusting screw 40, the thrust plate 41 fixed to the elevator frame 37 and the thrust means 42 on bar 36. This adjustment screw 40 may be about eighteen inches long and thereby provide considerable take-up in the conveyor chain 10.

To make the compensation for wear the four bolts holding the return sprocket 23 on hub 32 are removed. The bolted brackets 48 on the adjusting bar 36 for the idler sprocket 35 at the discharge end of the elevator are loosened. The idler sprocket 35 is then moved outwardly by advancing the adjusting bar 36 along the adjusting screw 40 by means of nut 56. This will draw the chain upwardly in chute 25 and since the sprocket 23 is free to turn on its flanged mounting hub 32, the tension in the chain is uniform. Finally, the bolted brackets 48 are tightened and the four hub bolts are replaced in the sprocket 23 and hub 32.

If desired, a movable blade scraping means 43 may be provided at a point beyond the upper limit of the chutes 24 and 25. This blade scraping means 43 may be pivoted at 44 to extension 45 of the adjusting bars 36. A resilient bumper 46 is carried by the scraping means 43 and coacts with pin 47 fixed to extension 45 to restrict the inward movement of the cleaner 43 after the blade 14 has passed on. The blade cleaner 43 is returned to a point near the idler sprocket 35 by spring 50 to engage the next blade 14. This mechanism is shown in FIGURES 4, 5 and 10. To guide the paddles from the idler 35 to return chute 25, guide bar 51 may be provided.

Ordinarily the chain 10 can be prefabricated in conveniently handled lengths and then assembled at the site. This may be done by welding a link 12 in place or a special connecting link 49 may be provided. This connecting link 49 is intended to travel in a vertical plane and to remain in tension between links 12. The connecting link 49 has an inverted V-shaped notch 51 in the upper edge, the lower ends of the notch being undercut at 52 and 53 toward the ends of the link to receive the adjacent horizontal links 12. Inasmuch as means is provided for adjusting the tension in the chain 10, the open connecting links 49 can be inserted where needed and then placed in tension.

Referring to FIGURES 11, 12 and 13, the head of the elevator 24—25 includes a platform 56 supported by adjustable bars 36 secured by bolts 48. A motor 57 and transmission 58 are mounted on the platform 56, the motor 57 driving the transmission 58 through pulley 60 and belt 59. The transmission in turn drives the sprocket 35 through the drive shaft 61, causing the chain conveyor 10 and paddles 14 to travel up the inclined channel or chute 24, about the sprocket 35 and down the chute 25. In this connection, it will be understood that the paddle cleaner assembly 43 et seq. of FIGURES 4 and 6 are also used in the embodiment of FIGURES 12 and 13 but are omitted from the drawing for clarity. The depending guide 54a engages the inner end of the paddle 14 of the conveyor 10 as shown, thereby disposing the material engaging paddles in substantially the plane of rotation of the sprocket 35 in changing direction when passing from one channel to another during the paddle cleaning operation as described above.

When the conveyor-elevator is employed as a stock feeder, a hopper 61 is placed astride a channel and discharges thereinto. Likewise the elevator may discharge into a second looped channel on a second level and a second pair of inclined parallel channels similar to those shown may extend downwardly from the second level. Furthermore, a single endless conveyor may be provided for travel through the two looped channels and the inclined channels. Spaced slats 62 may be used to provide a floor across the channel and above the conveyor in the channel. Such an arrangement is useful in poultry houses wherein the slats comprise the floor of the pens and the conveyor runs within a pit or gutter below the floor.

Although the invention has been described with reference to a barn cleaner, it may be used for other purposes in animal husbandry such as for example in the conveying of feed to animals within linear and non-linear channels operating on single or multiple levels as the installation requires. It should be understood, therefore, that variations and modifications can be made in the described apparatus without departing from the spirit of the invention. Other types of kink-proof chain or flexible articulated conveyor structures are contemplated, in addition to the alternate loops, plates, or links which lie in mutually perpendicular planes in moving through the channels. Likewise, the idlers in the non-linear channels or direction-changing housings may be of the general form of the sprocket at the head of the elevator.

This application is a continuation-in-part of my copending application Serial No. 389,717, filed November 2, 1953, for Unitary Open-Top Channel Type Conveyor and Elevator, issued as U.S. 2,863,554.

Accordingly the invention is not limited to the precise details described and shown but includes such modifications and embodiments as will be apparent to those skilled in the art from the above disclosure.

What I claim is:

1. In a conveyor system for use in animal husbandry of the type which includes a circuit of linear and non-linear conveyor channels with a linked, endless conveyor running through such linear and non-linear channels, material engaging means on said conveyor and rotatable means about which said conveyor is trained, the improvement which comprises a sprocket, said sprocket being mounted on an axis substantially normal to the plane of travel of said conveyor within successive linear and non-linear channels, conveyor link aligning means on said sprocket, and a non-linear conveyor guide means below said sprocket and having at least a portion thereof concentric with said axis, said conveyor guide means having a surface area sufficient to accommodate said material engaging means.

2. The conveyor system of claim 1 wherein said conveyor guide means is rotatable with said sprocket.

3. The conveyor system of claim 1 wherein said conveyor guide means is ring-shaped and has an outside diameter which is substantially less than said sprocket and wherein an end of said material engaging means contacts said guide means upon travel of said conveyor about said sprocket.

4. The conveyor system of claim 3 wherein said guide means extends axially from said sprocket.

5. The conveyor system of claim 1 wherein said rotatable means includes a drive means for said conveyor.

6. The conveyor system of claim 11 which includes a hopper for flowable material discharging into said channels.

7. The conveyor system of claim 1 which includes an upwardly inclined channel having a place of discharge at the upper end thereof and a conveyor channel therebelow.

8. The conveyor system of claim 1 which includes upwardly inclined conveyor channel means, a rotatable means and curved conveyor guide means being mounted adjacent the upper end of said inclined conveyor channel means.

9. The conveyor system of claim 8 which includes drive means for said rotatable means carried by said inclined channel means.

10. A cleaner for use in animal husbandry which includes floor channels in a loop, a slat floor over said channels, and elevator means discharging at a level above said floor, said cleaner delivering material from under said slat floor to said elevator means.

11. The conveyor system adapted for use as a stock feed conveyor-elevator means including a circuit of linear and non-linear conveyor channels with a linked, endless conveyor running through such linear and non-linear channels, material engaging means on said conveyor and rotatable means about which said conveyor is trained, a supply hopper astride one of said linear channels, an upwardly inclined channel in said circuit having a place of discharge at the upper end thereof, a second circuit of linear and non-linear channels, a secondary downwardly inclined channel in said second circuit, said upwardly inclined channel discharging into said second circuit and said downwardly inclined channel discharging in said first circuit, a single continuous linked endless conveyor travelling through said circuits, and material engaging means on said conveyor, said material engaging means extending transverse to the axis of said conveyor and at least partially on both sides of said axis, said conveyor guide means holding the transverse material engaging means in an outward array in a plane parallel to the plane of turning movement of said sprocket.

12. The cleaner of claim 10 which includes two parallel channels and a transverse channel, said elevator means receiving conveyed material from said transverse channel and discharging the material from the upper end of said elevator means.

References Cited in the file of this patent

UNITED STATES PATENTS

| | | |
|---|---|---|
| 365,171 | Dodge | June 21, 1887 |
| 2,110,204 | Davis | Mar. 8, 1938 |
| 2,235,991 | Hapman | Mar. 25, 1941 |
| 2,499,212 | Custer | Feb. 28, 1950 |
| 2,554,589 | Patz | May 29, 1951 |